United States Patent
Woodard et al.

(10) Patent No.: US 12,067,223 B2
(45) Date of Patent: Aug. 20, 2024

(54) CONTEXT AWARE ANNOTATIONS FOR COLLABORATIVE APPLICATIONS

(71) Applicant: Nvidia Corporation, Santa Clara, CA (US)

(72) Inventors: Andrew James Woodard, Buckinghamshire (GB); Amy Rose, Chapel Hill, NC (US); Benjemin Thomas Waine, Cheshunt (GB); Johannes Zimmerman, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 223 days.

(21) Appl. No.: 17/173,310

(22) Filed: Feb. 11, 2021

(65) Prior Publication Data
US 2022/0253807 A1    Aug. 11, 2022

(51) Int. Cl.
G06F 3/048        (2013.01)
G06F 3/04845    (2022.01)

(52) U.S. Cl.
CPC .......... *G06F 3/04845* (2013.01); *G06F 2203/04804* (2013.01)

(58) Field of Classification Search
CPC .......... G06F 3/04845; G06K 9/6232
See application file for complete search history.

(56) References Cited

U.S. PATENT DOCUMENTS

| | | | |
|---|---|---|---|
| 7,356,563 B1 * | 4/2008 | Leichtling | G06Q 10/06 709/204 |
| 7,432,938 B1 * | 10/2008 | Reuter | G06F 40/134 345/672 |
| 8,533,586 B1 * | 9/2013 | Meyer | G06F 40/169 715/230 |
| 9,519,886 B2 * | 12/2016 | Berger | H04L 65/403 |
| 10,691,877 B1 * | 6/2020 | Eisner | G06Q 10/101 |
| 2006/0282762 A1 * | 12/2006 | Diamond | G06F 40/169 715/235 |
| 2009/0193032 A1 * | 7/2009 | Pyper | G06Q 30/02 |
| 2010/0325557 A1 * | 12/2010 | Sibillo | G06F 16/954 715/751 |
| 2013/0042171 A1 * | 2/2013 | Yang | G06F 40/169 715/230 |
| 2014/0089775 A1 * | 3/2014 | Worsley | G06F 16/27 715/230 |
| 2014/0344853 A1 * | 11/2014 | Maruyama | H04N 21/8583 725/32 |

(Continued)

OTHER PUBLICATIONS

Hunter et al., Co-Annotea: A System for Tagging Relationships, 2008, IEEE, 12 pages.*

(Continued)

*Primary Examiner* — Linh K Pham
(74) *Attorney, Agent, or Firm* — Hogan Lovells US LLP

(57) ABSTRACT

Annotations can be correlated to components of a document image so that the annotations track movements of the document image. A transparent overlay is generated to include the annotations and is linked to various components of the document image. Movement of the underlying document image is tracked and then adjustments in components positions are applied to associated annotations to maintain a contextual relationship between the annotations and the components of the document image.

17 Claims, 13 Drawing Sheets

(56) References Cited

U.S. PATENT DOCUMENTS

| | | | | |
|---|---|---|---|---|
| 2015/0082196 | A1* | 3/2015 | Berger | G06F 3/0484 |
| | | | | 715/753 |
| 2016/0188558 | A1* | 6/2016 | Shikawa | G06F 40/103 |
| | | | | 715/230 |
| 2017/0161246 | A1* | 6/2017 | Klima | G06F 40/58 |
| 2019/0026258 | A1* | 1/2019 | Sood | G06F 16/23 |
| 2019/0319995 | A1* | 10/2019 | Madisch | G06Q 10/101 |
| 2019/0325014 | A1* | 10/2019 | H. | G06F 3/04842 |
| 2019/0361969 | A1* | 11/2019 | Bhatt | G06F 40/134 |
| 2019/0370749 | A1* | 12/2019 | Milvaney | G06F 16/93 |
| 2021/0073324 | A1* | 3/2021 | Gupta | G06F 40/169 |
| 2021/0385554 | A1* | 12/2021 | Takahashi | H04N 21/4728 |

OTHER PUBLICATIONS

Oguma et al., Camera-Based System for User Friendly Annotation of Document, 2016, IEEE, 6 pages (Year: 2016).*

* cited by examiner

CONTEXT AWARE ANNOTATIONS FOR COLLABORATIVE APPLICATIONS

BACKGROUND

Collaborative working environments enable users to remotely collaborate on various media objects. Through popular applications of collaborative working environments, a media object owner may present, for display, a window that includes media objects. Other users within the environment may view the media object as presented by the owner. Certain working environments may provide capabilities to edit or annotate media objects, including text inputs, drawings, and other interactive components. Generally, these inputs are shown on a static overlay presented over the media object. Additionally, the inputs may be transient and fade over time. While these inputs may be useful in the short term, their relevance is decreased as changes in the viewing area of the media objects are made, or the underlying content is updated or changed, resulting in the previously submitted inputs being displayed with unintended or unrelated areas of the media objects.

BRIEF DESCRIPTION OF THE DRAWINGS

Various embodiments in accordance with the present disclosure will be described with reference to the drawings, in which.

DETAILED DESCRIPTION

Figure 1A:
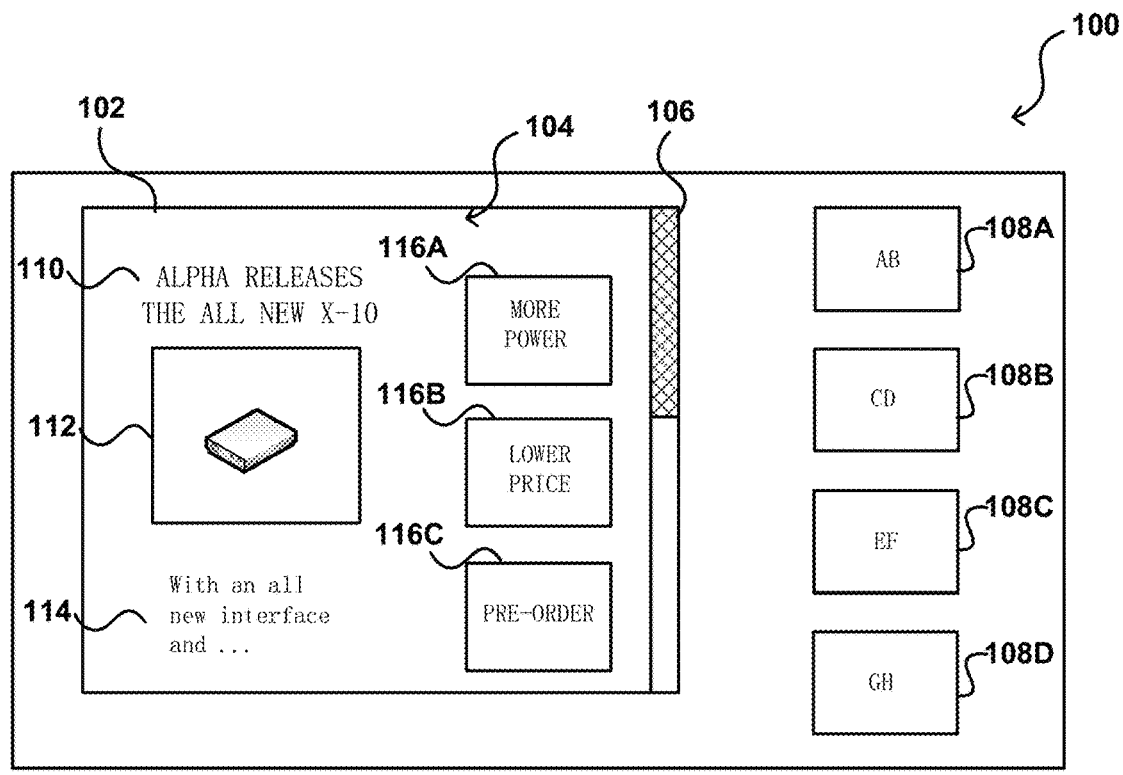
FIGS. 1A and 1B illustrate collaborative working environments, according to at least one embodiment.
Figure 1B:
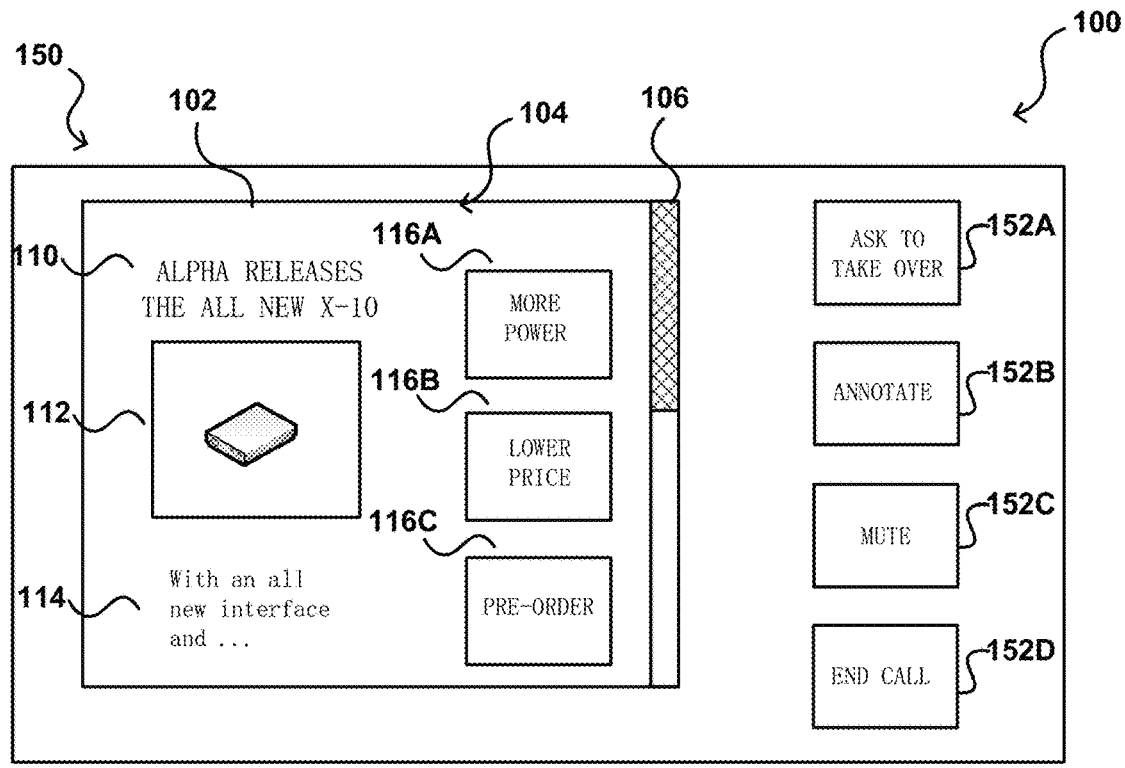

Approaches in accordance with various embodiments provide for context-dependent transparent overlays for annotations in collaborative viewing environments. Users may conference and collaborate using video systems that enable "screen sharing" or "document sharing" where a document owner may present a document, such as a text file, a photograph, a video, or a mixed media file, for view to others participating in the conference. Conference participants may view the document and provide annotations from their personal viewpoint that is mirrored or otherwise presented to other participants as well. FIGS. 1A and 1B illustrate examples of a collaborative environment 100 where users may view a shared document. In these examples, a viewing area 102 includes a document image 104, which in this example is a mixed media document including text and pictures, however other examples may include documents with text, images, video, in combination or alone. The document image 104 may mirror at least a portion of a screen associated with a first user, for example, a user participating within the collaborative environment and is rendered for viewing by a collaborative program for other viewers. The document image 104 is shown as a scrollable image, including a scroll bar 106, where the document image 104 contains additional information not currently visible within the bounds shown in FIGS. 1A and 1B. The scroll bar 106 may provide an indication of a position within the document image 104, relative to the entirety of the document, currently visible.

FIG. 1A illustrates features of the collaborative environment including content areas 108A-108D corresponding to other users currently participating in the environment. For example, the other users 108A-108D may be designated by their initials, by a video feed of the users, by an image of the users, by an avatar, or any other reasonable indicator. Various other features may also be present, but have been omitted for clarity with the present discussion.

Returning to the document image 104, the document represented includes multiple different parts or regions. In this example, a title 110, a picture 112, a text block 114, and content segments 116A-116 are visible. Different examples may also include various other features, such as a visible or a movable graphic. Additionally, the regions may be formatted in a variety of ways and, in various environments, may also include interactive elements such as hyperlinks, polls, input blocks, buttons, and the like.

FIG. 1B provides the collaborative environment 100 from a perspective 150 associated with a second user 108A. As shown, the document image 104 is being shared from the first user and appears within the viewing area 102. In this example, the second user perspective provides additional options for collaboration in the form of buttons or interactive elements 152A-154D, such as options to provide an annotation or to mute their microphone. By presenting the document image 104 within the viewing area 102, the first user may receive feedback or annotations, which may be provided directly onto the document in a manner that replicates a person drawing or writing on the document. However, it should be appreciated that formatted text or other annotations, such as highlighting, may also be used in place of freehand writing.

Figure 2A:
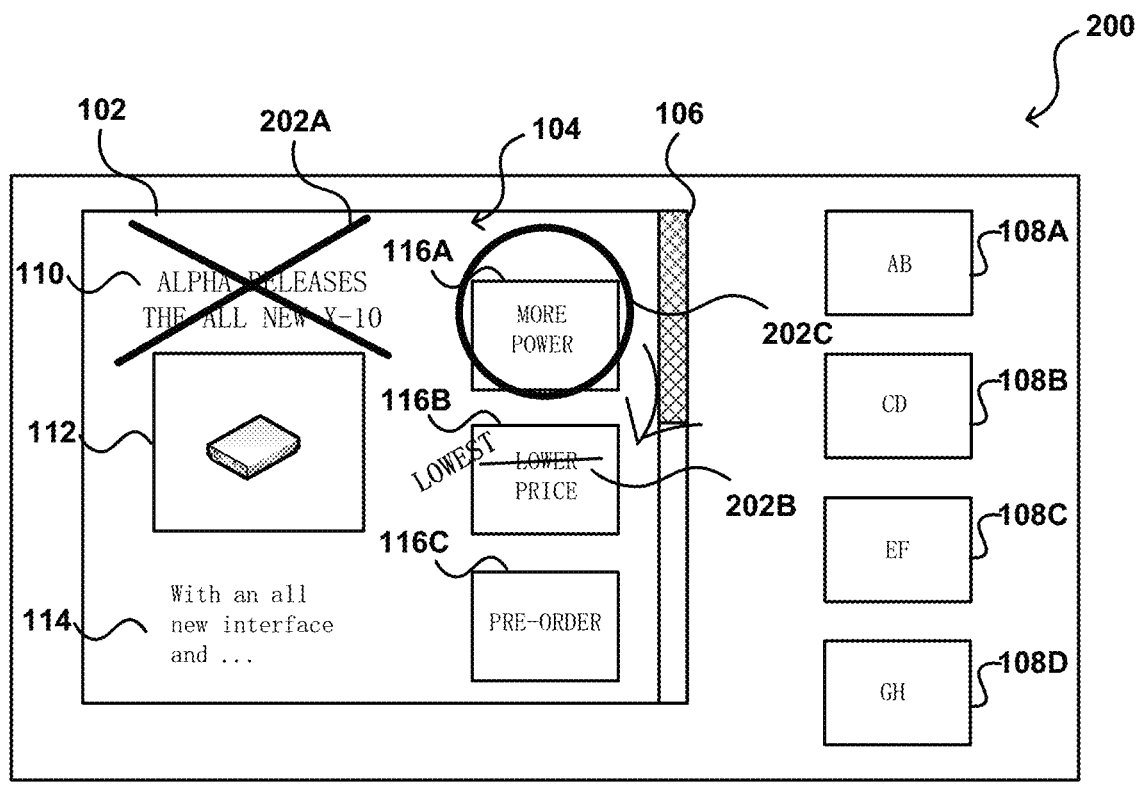
FIG. 2A illustrates a collaborative working environment with annotation inputs, according to at least one embodiment.

FIG. 2A illustrates an example annotated view 200 where the second user 108A has included annotations 202A-202C associated with the document image 104. In this example, annotations include a variety of different interactions or notes applied to the document image 104, such as crossing out text (202A), adding additional text (202B), and drawing shapes (202C). Annotations 202 may be added using tools accessible through software that enables the collaborative environment and/or through plug ins or a separate software package.

In this example, the annotation 202A corresponds to the title 110, the annotation 202B corresponds to the added text at the content segment 116B, and the annotation 202C corresponds to the shapes associated with content segment 116A. From the perspective of the user, the annotations are unique and specific to the underlying context elements. That is, the annotation 202A would be inapplicable to the content segment 116C or to the text block 114. However, scrolling or movement of the document image 104 may shift or otherwise change the content appearing within the viewing area 102. Systems and methods of the present disclosure provide a transparent overlay in order to track movement of the underlying content elements to maintain associations between annotations and content elements.

Figure 2B:
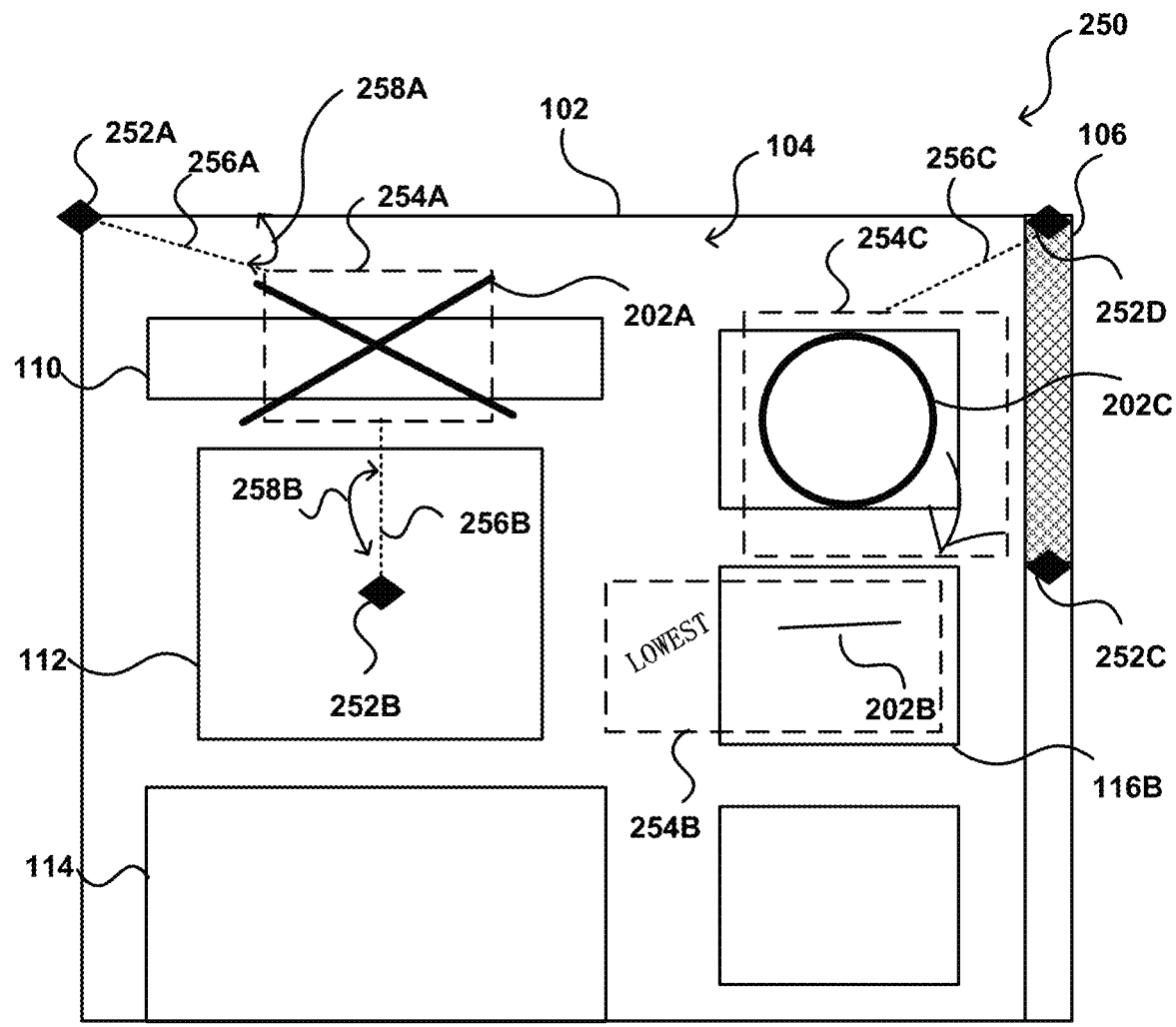
FIGS. 2B and 2C illustrate a collaborative working environment with context aware annotation inputs, according to at least one embodiment.

FIG. 2B illustrates an example content alignment view 250 where the annotations 202 are aligned with and associated with content elements corresponding to the document image 104. In this example, features have been removed for clarity. The annotations 202 may be aligned with associated content elements using one or more markers 252 obtained from the document image 104. In at least one embodiment, the markers 252 correspond to a position of the annotations 202 with respect to a window geometry. For example, the markers 252 may correspond to corners of the document image 104 and at least a portion of the annotations 202 may be defined by regions 254. These regions 254 may be positioned relative to the markers 252, such as defining a distance from the markers 252, an angle relative to the markers 252, a temporal component of the markers 252, or the like.

FIG. 2B illustrates a first marker 252A positioned at a top left corner. A first region 254A, represented by broken lines, of the annotation 202A is a first distance 256A from the first marker 252A and is arranged at a first angle 258A with respect to a boundary of the viewing area 102. Accordingly, this position may be associated with the geometry of the document image 104 such that as the underlying image moves, the annotation 202A moves with the image. For example, the first marker 252A may be associated with a particular location or view of the document image 104 such that movement of the document image 104 will also be correlated to movement of the annotation 202A.

The markers 252 may also be associated with components of the underlying document. In this example, a second marker 252B is positioned at a center point of the picture 112 and the first region 254 is a second distance 256B from the first region 254A and is arranged at a second angle 258B, which in this case is substantially 180 degrees. Accordingly, the position of the annotation 202A may be tracked and correlated to elements within the document image 104. In at least one embodiment, an image recognition model may be used to identify and extract various portions of the document image 104 to establish the markers. As an example, pixel analysis may be used to find edges of pictures 112 within the document images to establish borders of the pictures 112, which may be used as markers 252. As another example, an object hierarchy may be received and analyzed to determine different components parts of the document image 104, to determine boundaries for those parts, and then establish markers based on one or more of those boundaries. Accordingly, annotations 202 may be linked to the underlying content so that movement of those markers can be correlated to movement of the annotations 202. As an example, as a location of the image 112 moves responsive to movement of the document image 104, the annotation 202A may be moved along with the image 112 to maintain the second distance 256B.

In at least one embodiment, window elements may also be used as markers, which may be identified using one or more image recognition models as noted above. As an example, window elements may include a menu-bar, ribbon, scrollbar, minimize/maximize controls, editable surfaces of a document, and the like. For example, markers 252C, 252D are arranged at a top and bottom of the scroll bar 106. As noted above, these markers 252C, 252D may then be utilized to determine a relative position of the annotations 202A-202C with respect to the scroll bar 106, which may then be updated responsive to movement of the underlying document, such as scrolling, zooming, panning, or other changes. In this example, a third distance 256C is determined between the third region 254C and the marker 258C, as noted above.

It should be appreciated that other methods and approaches may be used to correlate annotations to underlying content rather than absolute screen position at the time the annotation was added. As another example, annotations may be positioned relative to underlying content elements, which may include position location as one or more components of metadata corresponding to the document image 104. As shown in FIG. 2B, a second region 254B at least partially overlaps the content element 116B. A boundary of the second region 254B may be tagged or otherwise located with respect to boundaries of the content element 116B, which may include a border or other indicator that is stored in metadata. As a result, a position of the second region 254B, and the associated annotation 202B, may be tied to position information of the content element 116B, such that rendering of the content element 116B provides position information for rendering of the annotation 202B.

Figure 2C:
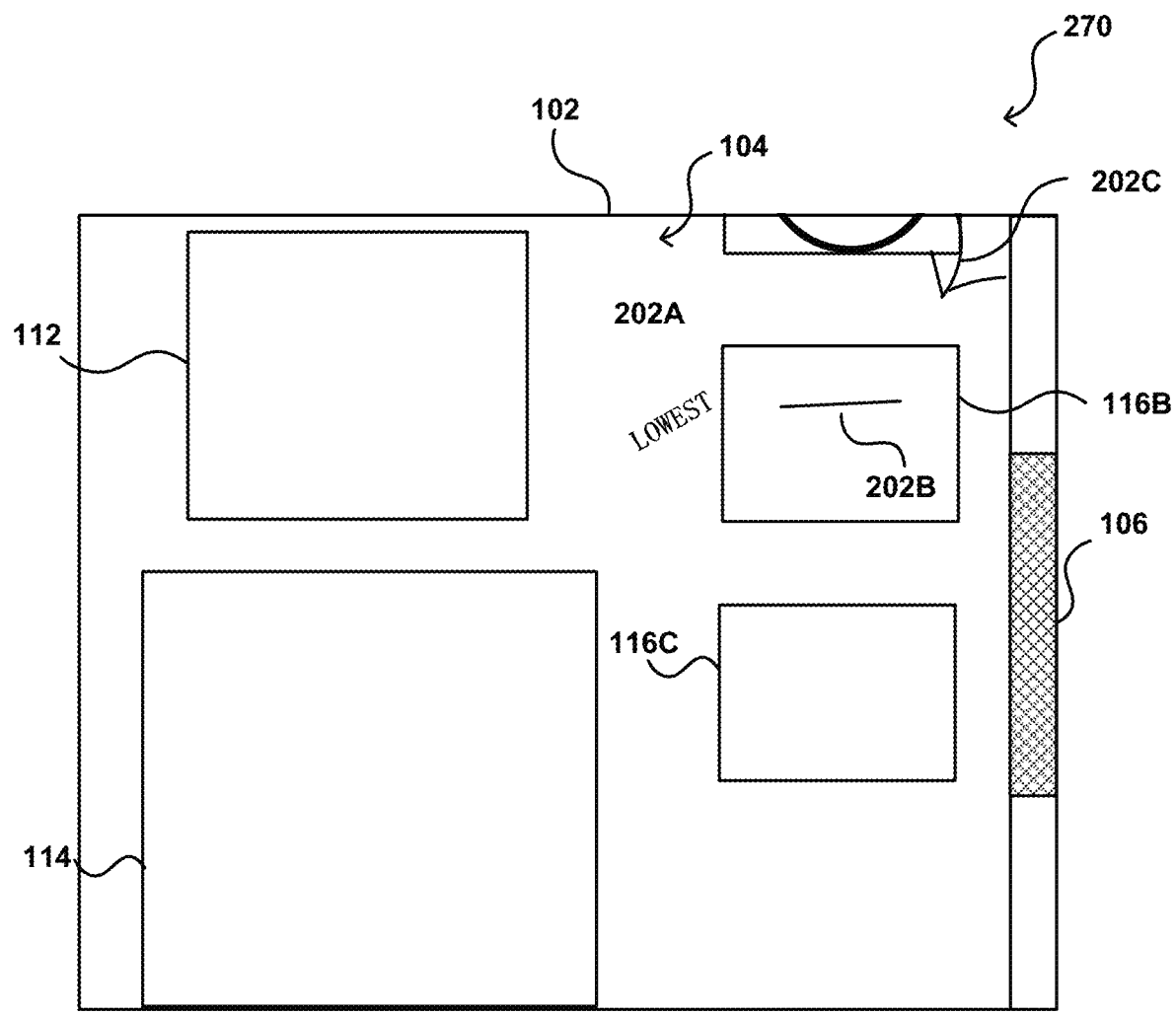

FIG. 2C illustrates an example updated view 270 where the document image 102 has been scrolled within the viewing area 102 to adjust relative positions of the content elements when compared with FIGS. 2A and 2B. As illustrated, the annotations 202 have moved along with their underlying content elements, thereby maintaining their relevance and correspondence. For example, the annotation 202C is now partially obscured or clipped because movement of the document image 104, represented by a shifted position of the scroll bar 106, has updated and changed elements within the viewing area 102. Moreover, the title 110 is no longer visible, and as a result, the annotation 202A associated with the title 110 is also not visible. In other words, content from the overlay with the annotations 202 is clipped responsive to the visible area of the document image 104. Without associations to the underlying content, the annotation 202A from the 110 would now be positioned over the image 112, providing an erroneous comment to the underlying document image 104.

Figure 3:
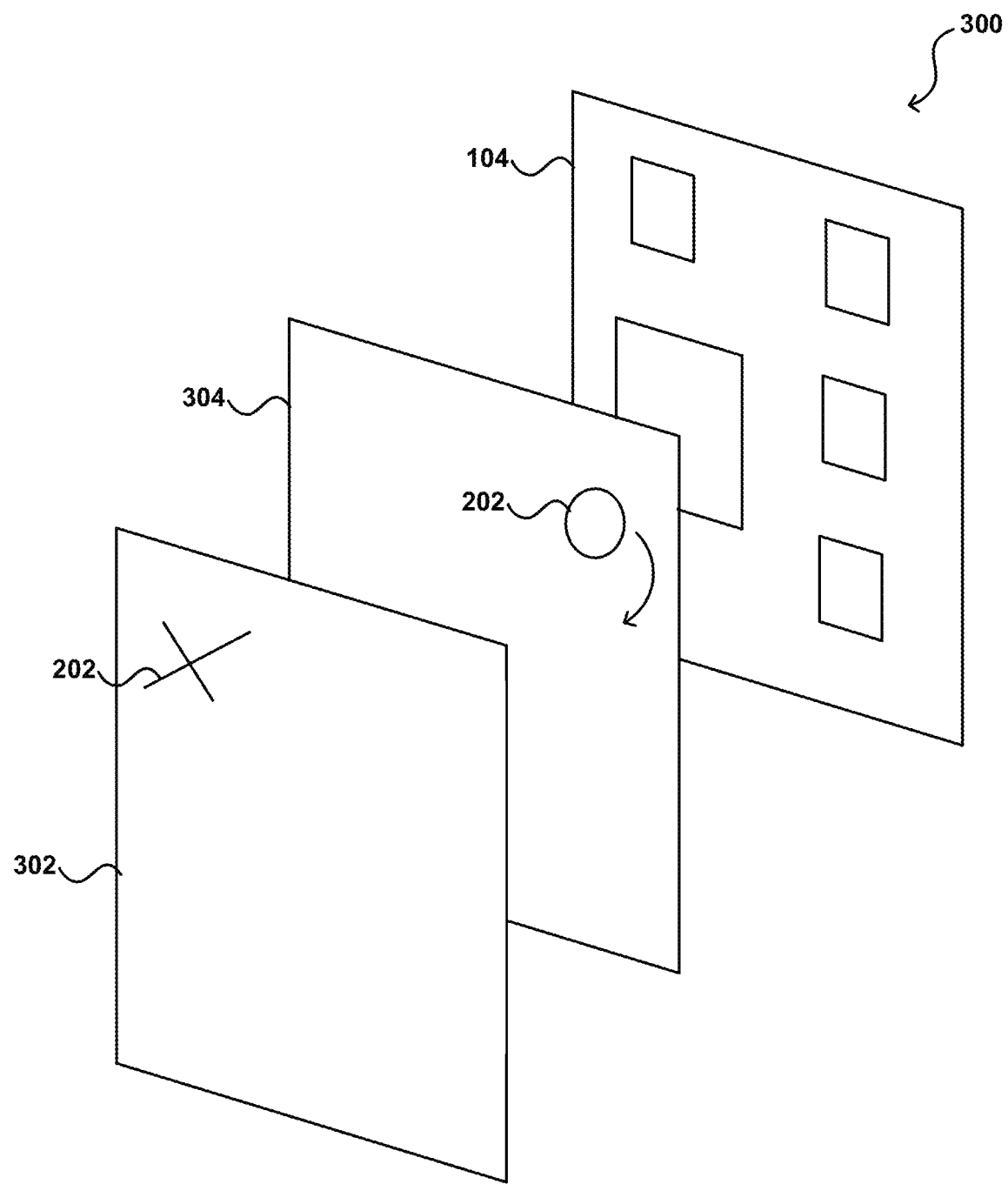
FIG. 3 illustrates transparent overlays that can be used for context aware annotation inputs, according to at least one embodiment.

FIG. 3 illustrates a layered arrangement 300 illustrating independent transparent layers 302, 304 corresponding to annotations for particular users within the collaborative working environment. These transparent layers 302, 304 may produce an overlay onto the underlying document image 104, which may be owned or managed by a host user. During the collaborative working session, independent transparent layers are generated for individual users, which may include respective annotations 202 associated with the individual users. These layers may be stacked or otherwise presented as overlays to the document image 104, which may then be presented to include each of the layers 302, 304. In at least one embodiment, the document owner may toggle through the different layers 302, 304 and may change their visibility by hiding one or more layers. As a result, collaborative working sessions may focus on individual annotations from users while hiding others, which may reduce onscreen clutter or enable focused working sessions. In certain embodiments, saving document image 104 may include the layers 302, 304 within the save file such that at later sessions the layers 302, 304 may be presented and used for further evaluation, editing, or the like.

In at least one embodiment, z-ordering of the layers 302, 304 may be adjusted by the document owner. For example, the layers 302, 304 may have overlapping regions and the user may choose to position one over the other. Accordingly, the transparent layer 304 in this example may be positioned higher or over the transparent layer 302. Accordingly, transparent layers for different users may be added, removed, or reordered on a per-user basis. Furthermore, transparent layers may also be classified by categories of annotations, such as notes or suggested changes, and well as over time if multiple rounds of collaboration are used to generate multiple sets of annotations.

Figure 4:
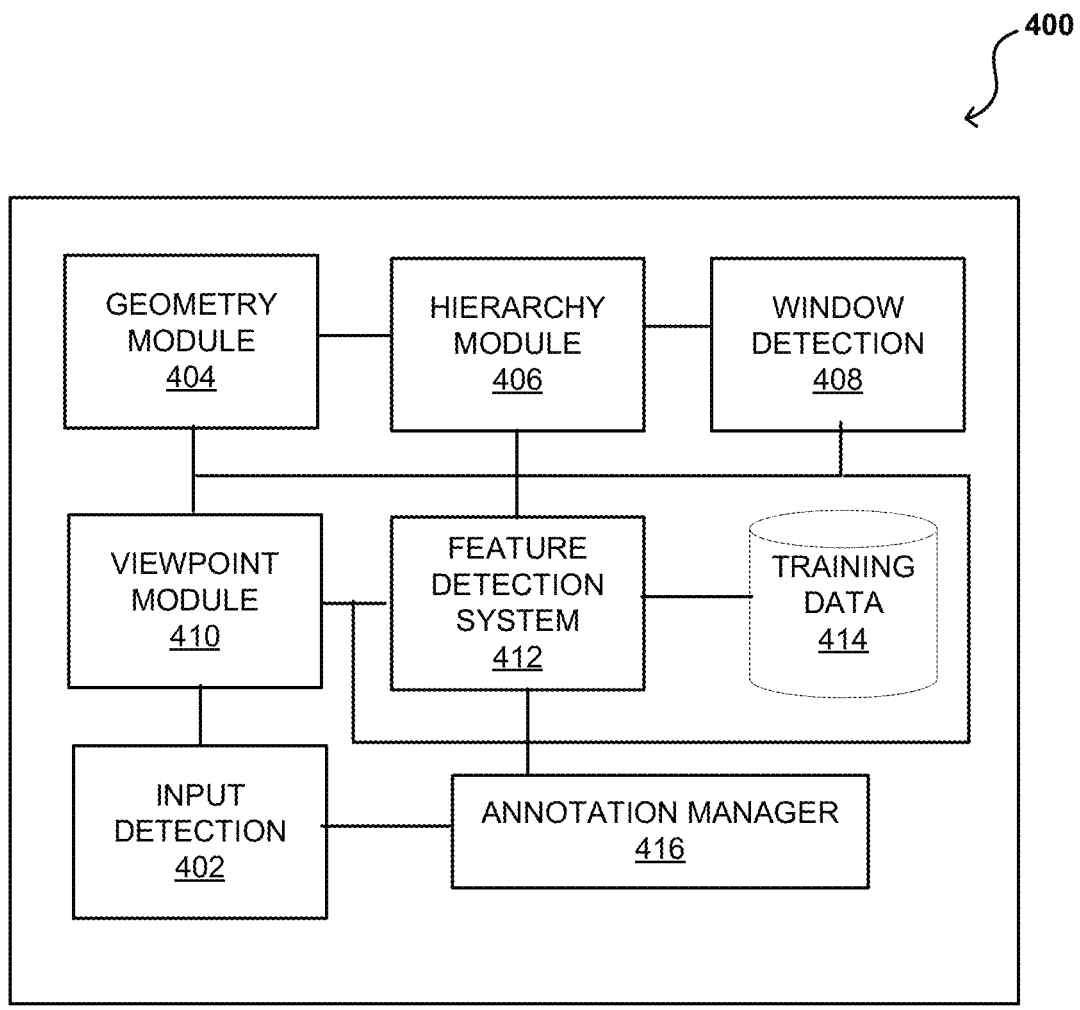
FIG. 4 illustrates a system diagram that can be used for context aware annotation inputs, according to at least one embodiment.

FIG. 4 illustrates an annotation control system 400 that may be incorporated as a software or service package with one or more collaborative working programs, such as video conferencing with screen sharing capabilities. The illustrated system 400 includes an input detection module 402 to recognize inputs associated with annotations. As an example, the input detection module 402 may recognize an input onto a generated transparent overlay associated with a user of the collaborative work environment. The input may be provided by a touch input, an interaction using a peripheral device, or the like. Detection of the input may be performed before or after generation of the overlay. For example, the overlay may not be generated until the input is detected to save processing capabilities, bandwidth, and memory use. However, in various embodiments, overlays may be generated by default and then discarded after a collaborative session if no inputs are added. In various embodiments, saved overlays may include metadata including the user that created the overlay, the time the overlay was created, and the like.

Further illustrated are various components to facilitate placement of annotations relative to underlying content within a document image. These components may be used individually or in combination. For example, it may be determined that certain types of documents or images are better suited for different placement detection methods. In one example, a geometry module 404 is used to track window geometry for a user presenting the document image. For example, an application program interface (API) may track window geometry such as position, width, height, and the like. As noted above, window geometry may be used to identify and place one or more markers, such as at boundaries of the document.

FIG. 4 also illustrates a hierarchy module 406, which can be utilized to identify one or more components of the document image. As an example, the hierarchy module may receive metadata associated with the document image, such as text blocks, images, and the like forming the document. This information may then be used to, along with position information of those components, to establish the contextual relationship between the content items and the annotations. For example, the hierarchy module 406 may be used to identify a header in a document and annotations to the header may be positioned relative to the header. As users move through the document, the header may no longer be visible, and as a result, annotations may be clipped in response to the new position of the header.

Also illustrated is a window detection module 408 for identifying an active window or segment for annotations. In an example, identification of an active, non-transparent window may facilitate positioning of the annotations in order to associate the underlying content with the annotation. In at least one embodiment, an alpha value check may be performed to identify an active window and/or overlapping windows. For example, an active window may include transparent sections that enable another window to be at least partially visible, but may not be the focus of the collaborative environment and subsequent annotations. Moreover, the window detection module 408 may facilitate switching and generation of new, independent transparent overlays for different windows. As an example, a first document may have a first transparent overlay for annotations and a second document may have a second transparent overlay for annotations, with the user selectively switching between the documents. Accordingly, overlays may be created and maintained per foreground window and be separately assigned to different applications. These overlays may be separately maintained and stored for different applications used throughout the collaboration process.

A viewpoint module 410 may track a position of the document image, for example locations of content items forming the document image, a temporal position of a video, or the like. In at least one embodiment, the viewpoint module 410 may receive an indication associated with an interaction and determine an absolute screen position at the time of the indication. The viewpoint module 410 may then track movement of items relative to the absolute position at the time of interaction to determine movement of the underlying document, which may be utilized to adjust positions of the annotations. In at least one embodiment, the viewpoint module may also evaluate one or more features of computing devices being used for the collaborative working environment in order to adjust the appearance of the annotations. By way of example, users may be utilizing computing devices with different resolutions, different screen sizes, and the like. Accordingly, the viewpoint module 410 may develop a coordinate system between the different users, where the document image may serve as a primary coordinate system and adjustments to annotation positions may be made relative to one or more properties of the devices of other users participating in the environment. In at least one embodiment, the viewpoint module 410 may also track the document image relative to an entirety of the document. That is, if a user has zoomed into a specific location where the overlay pixel information is larger than pixel information within the relevant portion currently visible, annotations may be associated with content elements within a broader coordinate system for the document as a whole. As a result, when the user zooms out or pans to another location, annotations may be maintained with their associated content elements and their size may be adjusted according to changes in the appearance with respect to the document image.

The viewpoint module 410 may also provide a temporal component associated with the overlays. For example, the viewpoint module 410 may determine a time within a video file where the annotation is included. The context of that window or frame may be utilized for tracking the annotation, where the annotation may move with the underlying content for a period of time or may be restricted to a predetermined number of frames.

In at least one embodiment, a feature detection system 412 may be used to identify various regions of the document image to provide context-based associations to annotations and may be used in place of or in combination with the geometry module 404 and/or the hierarchy module 406. For example, the feature detection system 412 may include an image recognition artificial intelligence (AI) model that has been trained using information from a training database 414 to identify component of one or more applications. The components may include features such as a menu-bar, ribbon, scroll bar, minimize/maximize controls, and the like. These features may be specific to certain applications, which may also provide an indication of the document type and likely components forming the document. The AI model may decompose the contents of the window to build a contextual map of the application window to further update the alignment of the overlay responsive to movement of the underlying document. In at least one embodiment, the feature detection system 412 may also be applied to the annotations in order to identify and built the annotations into the contextual maps.

An annotation manager 416 may receive information from various other components of the system 400, generate individual transparent overlays for users within the collaborative environment, and manage interactions. For example, the annotation manager 416 may determine a number of users within the environment and assign each a separate, unique transparent overlay for a given window. In other embodiments, the annotation manager 416 may also provide a common, single transparent overlay that each user may utilize to provide annotations. The annotation manager 416 may then be used to render the transparent overlays onto the document image, which may take the form of a series of layers that may be toggled, hidden, and the like. Furthermore, in various embodiments, the annotation manager 416 may enable use with services that do not support distributed content editing by establishing annotations based on screen pixels. Accordingly, user interactions during collaborative working sessions may be tracked, saved, and then rendered along with the document image for later use and evaluation.

In at least one embodiment, overlays may be saved as an image file or an API may feed into other applications to incorporate the annotations as layer within the document. The storage format may include the visible screen and/or application pixel state. All annotations may be composed together (e.g., flattened) or stored as separate objects or layers, as shown in FIG. 3. Thereafter, reopening the document may provide an alert regarding the annotation layers in certain embodiments.

Figure 5:
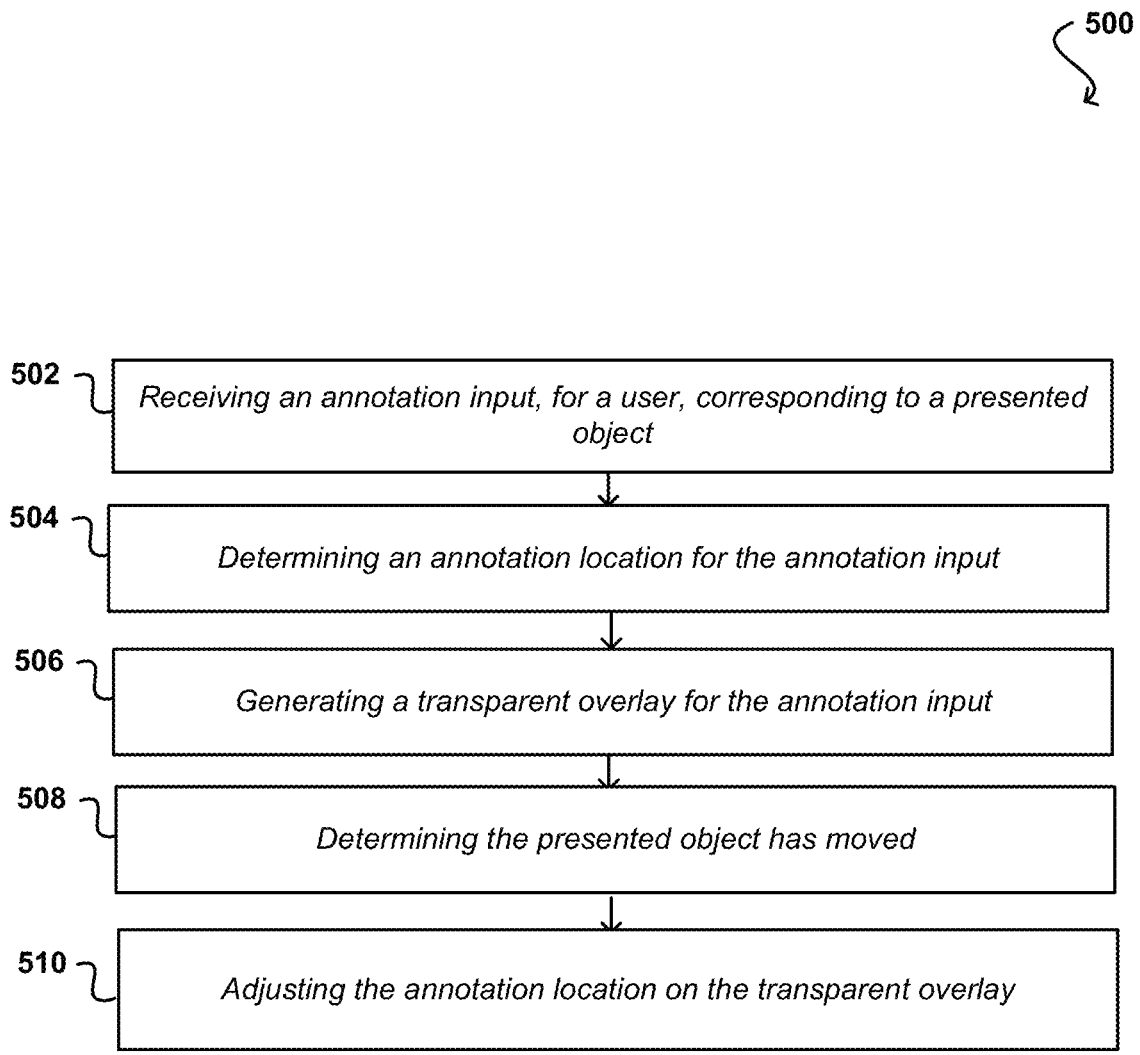
FIG. 5 illustrates an example process for adjusting an annotation input using a transparent overlay, according to at least one embodiment.

FIG. 5 illustrates an example process 500 for adjusting an annotation position based on movement of an underlying associated object. It should be understood that for this and other processes presented herein that there can be additional, fewer, or alternative steps performed in similar or alternative order, or at least partially in parallel, within scope of various embodiments unless otherwise specifically stated. In this example, an annotation input is received 502. The annotation input may be an input to provide a marking on an object being presented in a collaborative working environment, such as an object presented to multiple users using a screen sharing feature. An annotation location is determined 504 relative to the object. As noted above, the annotation location may correspond to one or more components of the object, and as a result, the annotation location may have a context-based association with the one or more components of the object. In various embodiments, the annotation location may be determined as a distance from a marker, a distance from a component, a position relative to a component, or the like. In at least one embodiment, a transparent overlay is generated for the annotation input 506. The transparent overlay may be generated relative to the presented object at the time of the annotation input. The transparent overlay may be generated before or after the annotation input and may also be generated independently for each user in the environment, for particular users in the environment, or may be a common overlay for one or more users in the environment.

A determination may be made that the presented object has moved 508. For example, the presented object may be a document and a host or owner may have scrolled to a different region of the document, zoomed into a region, panned across the document, or the like. In at least one embodiment, the determination may be based at least in part on tracking of various components along a coordinate system corresponding to the presented object at the time an annotation input was received. Responsive to the movement of the presented object, the annotation position may be adjusted on the transparent overlay 510. For example, the annotation input may move along with the presented object in order to maintain an association between a component and the annotation input. Additionally, the annotation may be clipped or otherwise adjusted based on the movement. As an example, the annotation may be partially visible due to movement taking at least a portion of the annotation out of a visible area or the annotation may be enlarged due to a user zooming into an area including the annotation.

Figure 6:
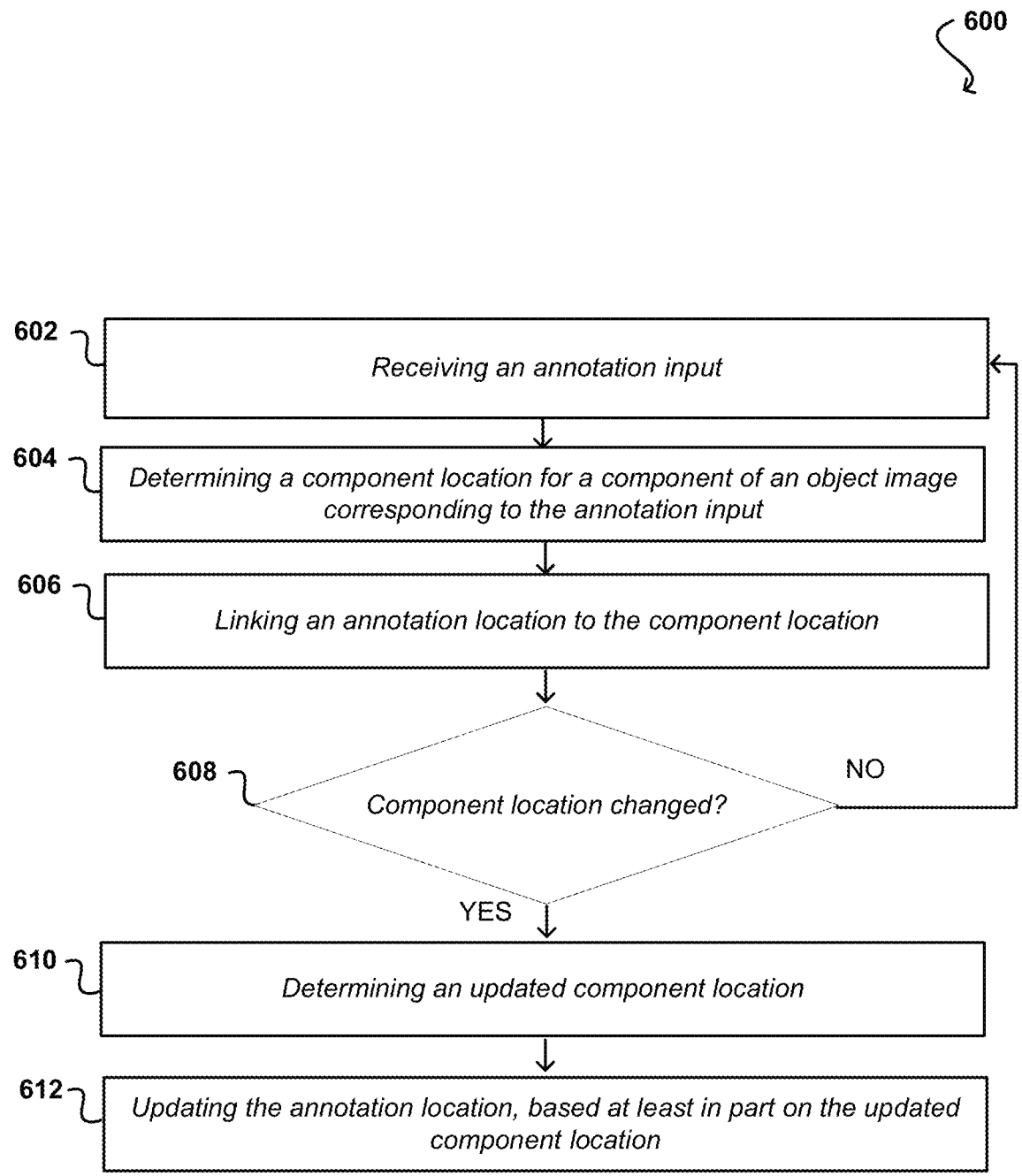
FIG. 6 illustrates an example process for adjusting an annotation input responsive to movement of an underlying component, according to at least one embodiment.

FIG. 6 illustrates an example process 600 for updating an annotation location responsive to movement of an underlying object location. In this example, an annotation input is received 602, which may correspond to an input on an object image being presented in a collaborative working environment. In at least one embodiment, a component location is determined for a component of the object image 604. The component may correspond to a visual feature presented in the object image, such as a text block or video. The component location may correspond to a relative location based on a geometry of a viewing window, a relative location based on a geometry of the object image, a relative location based on a hierarchical structure of the object image, or a relative location based on an extracted feature of the object image, among other options. In at least one embodiment, the annotation input corresponds to an annotation and an annotation location is linked to the component location 606. Linking the annotation location to the component location may include determining a position of the annotation relative to the component, establishing a relationship between the annotation and the component, or the like.

In at least one embodiment, a determination is made whether the component location has changed 608. A change in the component location may correspond to movement of the object image relative to a viewing screen. For example, a change may include scrolling through a document or a temporal change in a video, among other options. If there is no change, the process may continue to determine if additional annotation inputs are provided. If there is a change, the component location is updated 610 and the annotation location is also updated 612, based at least in part on the updated component location. In at least one embodiment, the updated locations may drive an updated rendering of the object image, such that the component and the annotation are illustrated in different positions compared to when the annotation input was received. Accordingly, the annotation may maintain a contextual link to the component as visual area of the object image changes.

Figure 7:
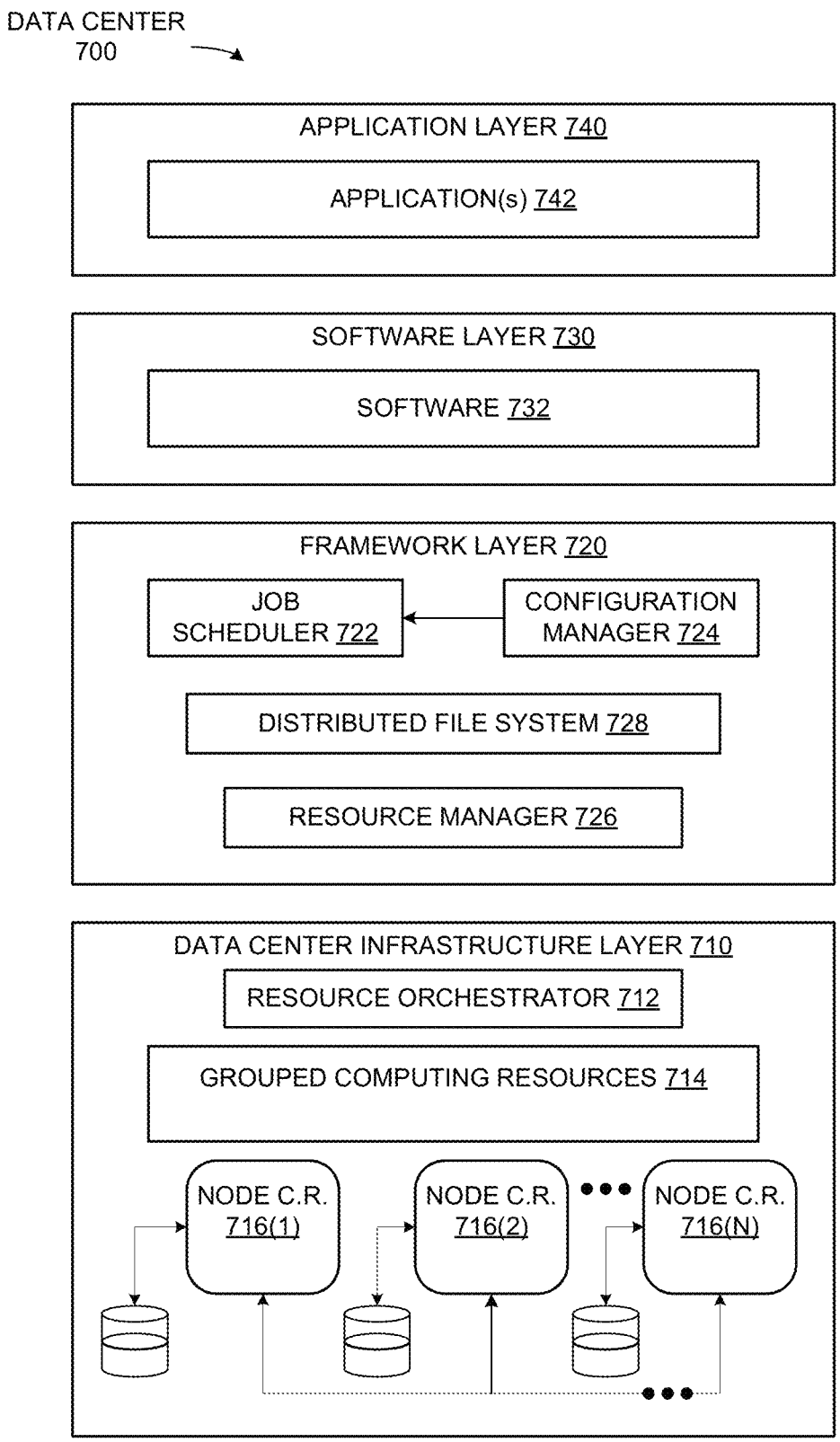
FIG. 7 illustrates an example data center system, according to at least one embodiment.
Figure 8:
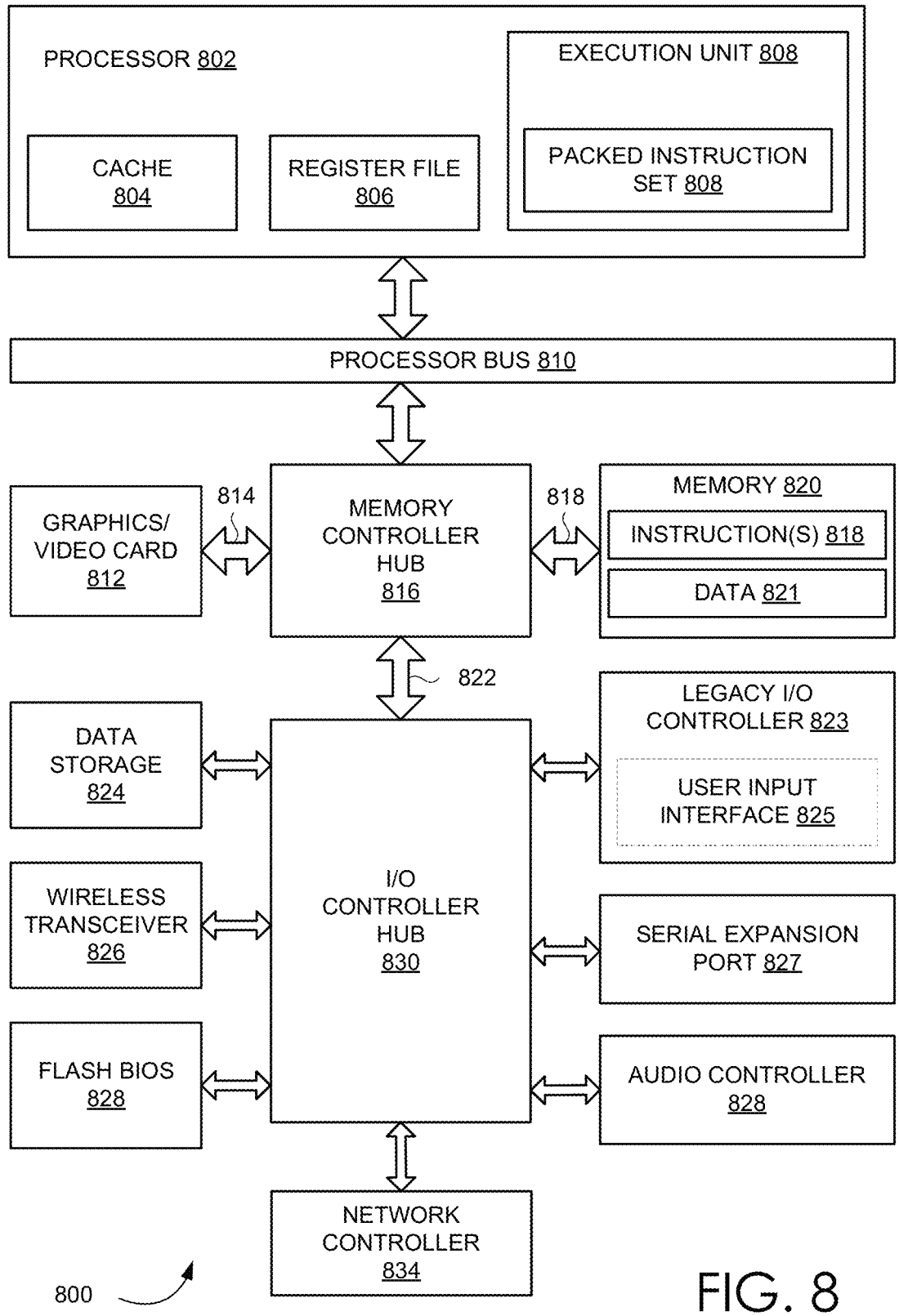
FIG. 8 illustrates a computer system, according to at least one embodiment.

This location tracking and subsequent rendering can be performed on a standalone client device, or a remote server in a data center, among other such options. FIG. 7, discussed in more detail below, illustrates example components of a data center, while FIG. 8 illustrates components of a computer, such as a desktop computer or content server. Generation of transparent overlays for context based annotations can be performed in a graphics processing unit (GPU), as discussed with respect to FIGS. 10 and 11, but can also be executed using CPUs, combination GPU/CPUs, or other such processing devices.

Data Center

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to generate transparent overlays for context based annotations, for example with collaborative working environments.

Computer Systems

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof In at least one embodiment, one or more components of computer system 800 are interconnected using compute express link (CXL) interconnects.

Such components can be used to generate transparent overlays for context based annotations, for example with collaborative working environments.

Figure 9:
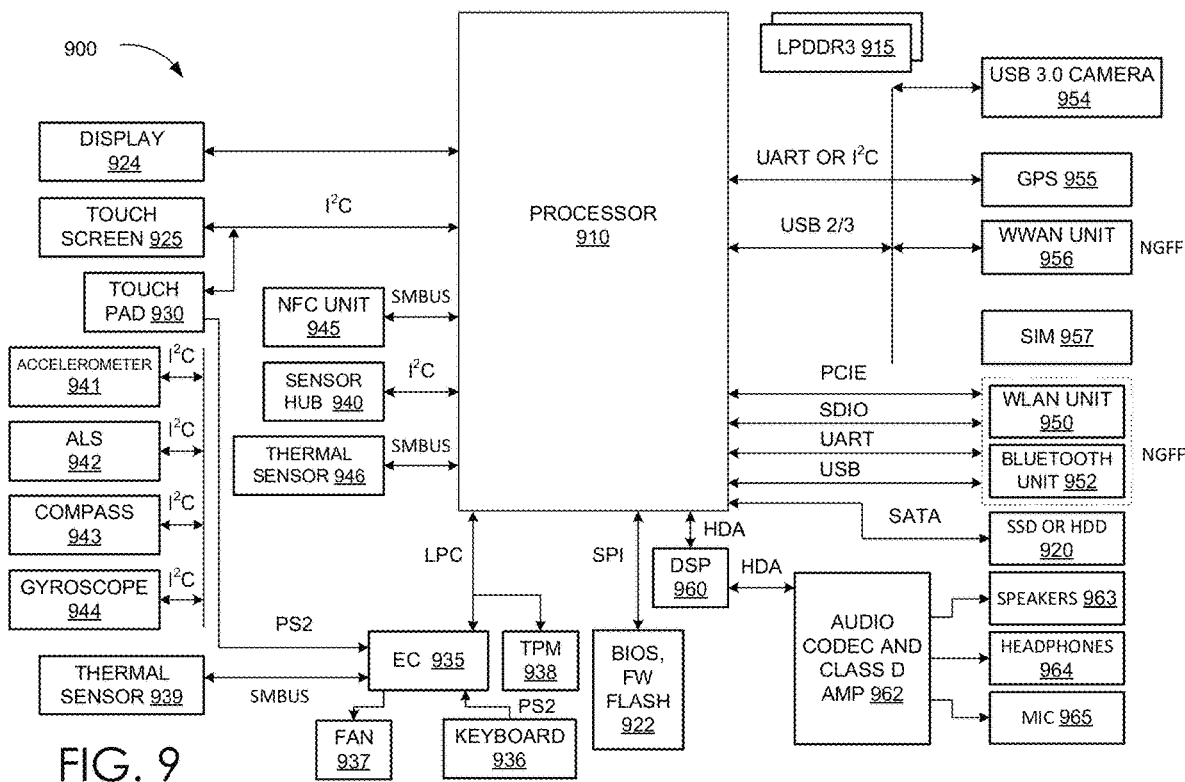
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to generate transparent overlays for context based annotations, for example with collaborative working environments.

Figure 10:
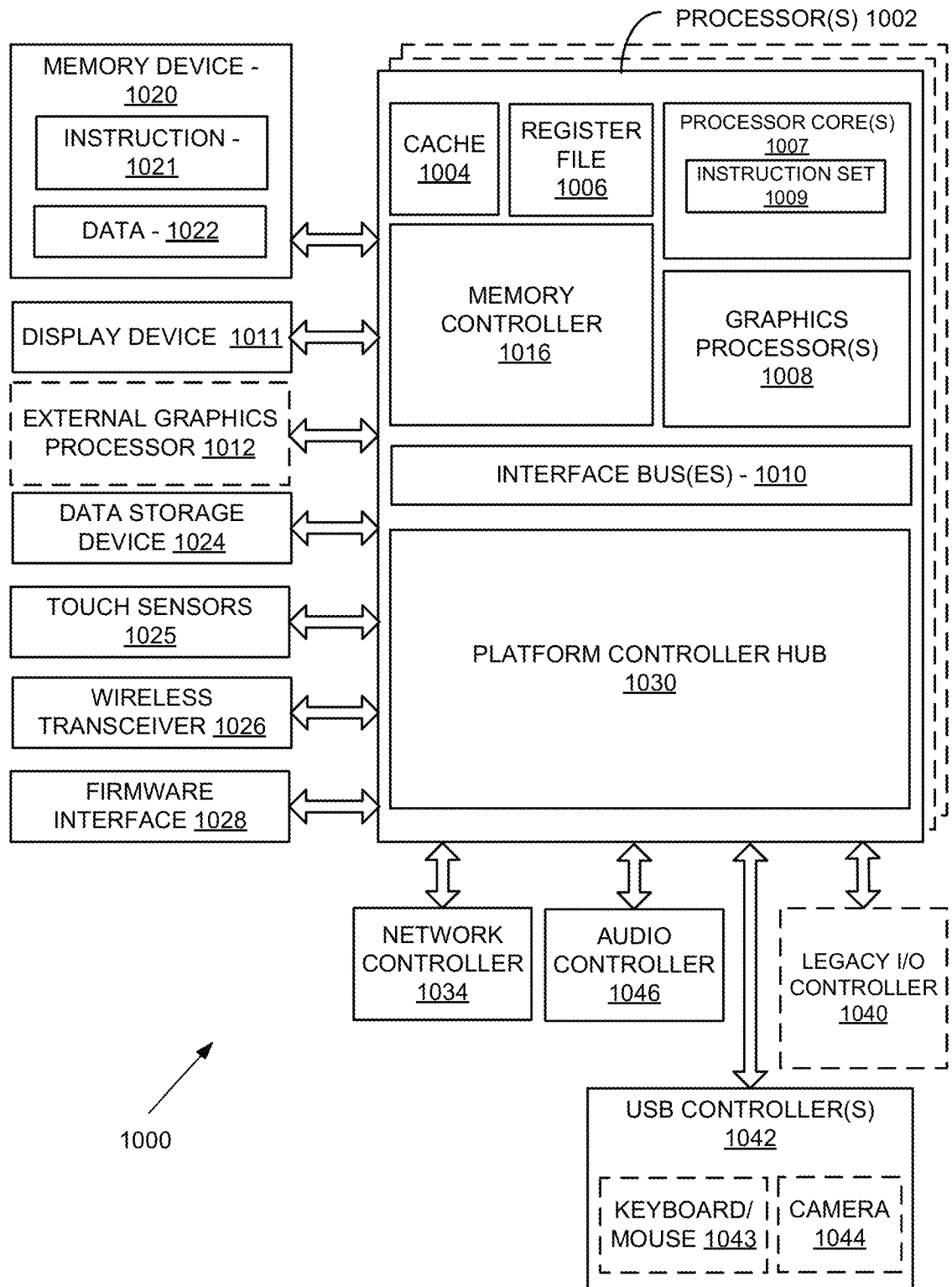
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to generate transparent overlays for context based annotations, for example with collaborative working environments.

Figure 11:
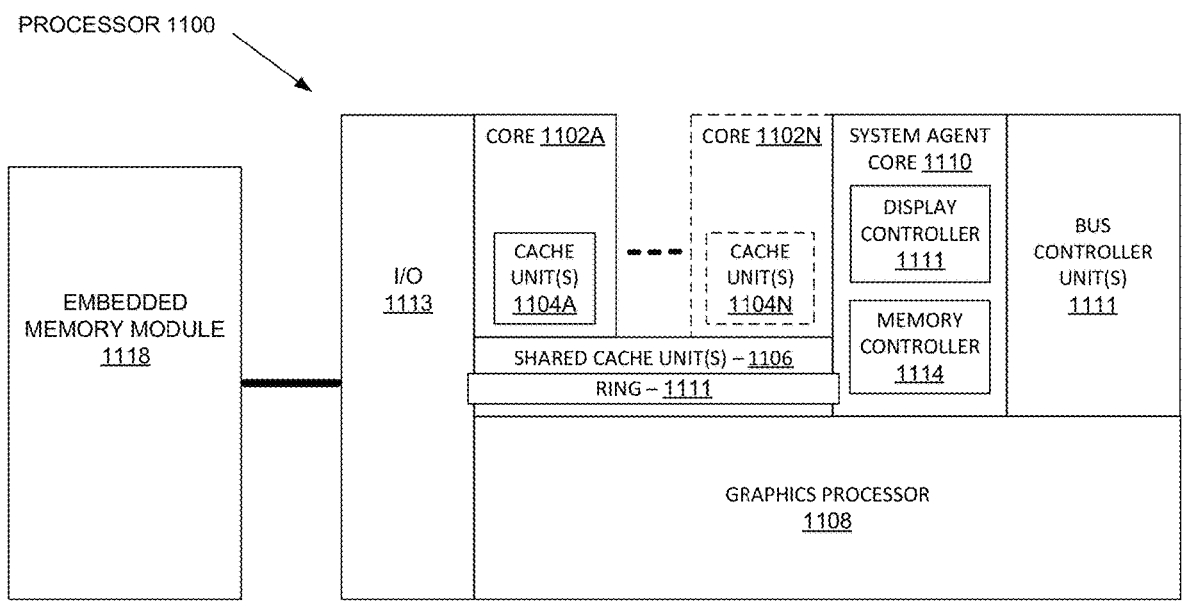
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to generate transparent overlays for context based annotations, for example with collaborative working environments.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving an annotation input overlaying a region of a document, the annotation input corresponding to a non-textual modification to a presented object in the document controlled by a host user, the non-textual modification covering at least a portion of the presented object;
determining, based at least in part on information about the presented object associated with the annotation input, an annotation location correlating to one or more edges of the presented object;
associating the annotation input with a transparent overlay, the associating including associating the transparent overlay with the annotation input at the annotation location;
determining a first coordinate system for a first user providing the annotation input;
determining a second coordinate system for the host user;
determining an offset between the first coordinate system and the second coordinate system, the offset based at least in part on an attribute corresponding to respective screen resolutions for the first user and the host user;
adjusting the annotation location, based at least in part on the offset, for the annotation input in the second coordinate system; and responsive to movement of the presented object, adjusting a presentation of the transparent overlay to maintain a position of the annotation location relative to the presented object to present the annotation input at the annotation location in the second coordinate system.

2. The computer-implemented method of claim 1, further comprising:
receiving an object hierarchy for the presented object;
determining a feature of the object hierarchy; and
correlating the annotation location to the feature of the object hierarchy.

3. The computer-implemented method of claim 1, further comprising:
determining a geometry of the presented object; and
determining a distance between a marker associated with the presented object and the annotation input.

4. The computer-implemented method of claim 1,
receiving a movement input to change an appearance of the presented object;
determining at least a portion of the annotation input, after the movement input, is outside of a viewable area;
clipping the annotation input; and
presenting at least a second portion of the annotation input within the viewable area after the movement input.

5. The computer-implemented method of claim 1, wherein a plurality of annotation inputs from a plurality of users correspond to respective transparent overlays for each individual user.

6. The computer-implemented method of claim 1, further comprising:
determining an active window, responsive to the annotation input, based at least in part on an alpha value.

7. The computer-implemented method of claim 6, further comprising:
linking the transparent overlay to the active window.

8. A system, comprising:
at least one processor; and
memory storing instructions that, when executed, cause the system to:
generate a transparent overlay including an annotation input of a non-textual annotation to modify an underlying object in a region of a document controlled by a host user, the non-textual annotation being visible over the underlying object and representative of a change to be made to the underlying object;
determine, based at least in part on information from the underlying object, a relative location of the annotation input correlating to one or more edges of the underlying object;
determine a first coordinate system for a first user providing the annotation input;
determine a second coordinate system for the host user;
determine an offset between the first coordinate system and the second coordinate system, the offset based at least in part on an attribute corresponding to respective screen resolutions for the first user and the host user;
adjusting the relative location of the annotation input, based at least in part on the offset, for the annotation input in the second coordinate system; and
responsive to changes in a component position, adjust a presentation location of the annotation input to present the annotation at the presentation location in the second coordinate system.

9. The system of claim 8, wherein the instructions when executed further cause the system to:
receive, from an application program interface (API), information corresponding to the component position, the component position being determined by at least one of a window geometry, a hierarchical structure, or a feature detection system.

10. The system of claim 8, wherein the instructions when executed further cause the system to:
determine a window associated with the annotation input;
compute an alpha value for the window; and
determine the window is an active window.

11. The system of claim 8, wherein the transparent overlay corresponds to a unique user.

12. The system of claim 8, wherein the instructions when executed further cause the system to:
save the transparent overlay corresponding to annotations for the first user;
provide the transparent overlay to a second user; and
present the transparent overlay as a layered structure relative to the underlying object, the layered structure enabling activation and deactivation of the transparent overlay.

13. A system, comprising:
at least one processor; and
memory storing instructions that, when executed, cause the system to:
receive an annotation corresponding to non-textual content positioned to overlay at least a portion of presented content at a first position in a document controlled by a host user, the annotation being visible over the underlying object and representative of a change to be made to the underlying object;
determine, based at least in part on an annotation location, a first annotation presentation location correlating to one or more edges of the presented content at the first position;
determine a first coordinate system for a first user providing the annotation;
determine a second coordinate system for the host user;
determine an offset between the first coordinate system and the second coordinate system, the offset based at least in part on an attribute corresponding to respective screen resolutions for the first user and the host user;
adjust the presented content to a second position in the first coordinate system;
determine, based at least in part on an amount of adjustment between the first position and the second position, a second annotation presentation location in the first coordinate system;
determine, based at least in part on the amount of adjustment between the first position and the second position and the offset, the second annotation presentation location in the second coordinate system;
present the annotation at the second annotation presentation location in the first coordinate system, the second annotation presentation location corresponding to the presented content at the second position and the annotation overlaying at least a portion of the presented content at the second position; and
present the annotation at the second annotation presentation location in the second coordinate system.

14. The system of claim 13, wherein the instructions when executed further cause the system to:
determine at least a portion of the presented content is outside of a viewable area at the second position; and clip at least a portion of the annotation, the portion of the annotation corresponding to the presented content outside of the viewable area.

15. The system of claim 13, wherein the instructions when executed further cause the system to:
   determine an image size of the presented content exceeds a viewable area;
   associate the annotation input with a transparent overlay corresponding to the image size.

16. The system of claim 13, wherein the instructions when executed further cause the system to:
   receive a plurality of annotations from a plurality of users; and
   generate respective transparent overlays for each user providing an annotation of the plurality of annotations, the respective transparent overlays including each annotation provided by individual users.

17. The system of claim 16, wherein the instructions when executed further cause the system to:
   provide each transparent overlay, as an independent layer, to an owner of the presented content.

* * * * *